(12) United States Patent
Ravichandran (10) Patent No.: US 11,629,062 B2
(45) Date of Patent: Apr. 18, 2023

(54) SELF PROPAGATING LOW TEMPERATURE SYNTHESIS OF CALA2S4 AND FABRICATION OF IR WINDOW

(71) Applicant: Duraiswamy Ravichandran, College Station, TX (US)

(72) Inventor: Duraiswamy Ravichandran, College Station, TX (US)

(73) Assignee: TEXAS BIOCHEMICALS INC.

( * ) Notice: Subject to any disclaimer, the term of this patent is extended or adjusted under 35 U.S.C. 154(b) by 320 days.

(21) Appl. No.: 17/101,767

(22) Filed: Nov. 23, 2020

(65) Prior Publication Data

US 2021/0371295 A1 Dec. 2, 2021

Related U.S. Application Data

(63) Continuation of application No. 15/390,853, filed on Dec. 27, 2016, now Pat. No. 11,242,262.

(51) Int. Cl.
*C01G 9/08* (2006.01)
*C01B 19/00* (2006.01)
(Continued)

(52) U.S. Cl.
CPC .............. *C01G 11/02* (2013.01); *B28B 3/003* (2013.01); *B28B 11/243* (2013.01);
(Continued)

(58) Field of Classification Search
CPC ......... C01G 9/08; C01G 11/02; C01B 19/007; B28B 3/003; B28B 11/243;
(Continued)

(56) References Cited

U.S. PATENT DOCUMENTS

2017/0144934 A1* 5/2017 Hakmeh ............... C04B 35/645

OTHER PUBLICATIONS

Bor Jou Tsay, Li Hsing Wang, Min Hsiung Hon, Formation and densification of CaLa2S4 powders bysulfidization of modified metal alkoxides in different atmospheres, Materials Science and Engineering B72 (2000) 31-35 (Year: 2000).*

* cited by examiner

*Primary Examiner* — Bijan Ahvazi (57) ABSTRACT

A method is provided for producing an article which is transparent to near-wave IR, mid-wave and Long-wave multi-spectral and IR wavelength in the region of 0.4 µm to 16 µm. The method includes the steps of (a) Producing ultra-fine powder of $CaLa_2S_4$ via SPLTS process, (b) followed by pretreatment of the ultra-fine powder under inert and reducing gas conditions including $H_2$ or Argon or $N_2$ or $H_2/H_2S$, $H_2S$, and mixtures there of (c) followed by sieving the powder in 140 mesh screen and cold pressing the powder at 7000 psi for 7 min. into a disk shaped green body (d) then Cold-Isostatic Pressing (CIP) at 40,000 psi for 5 min in a rubber mold (e) finally sintered article of $CaLa_2S_4$ disk of 25.4 mm diameter with ultra-high density containing cubic phase of $CaLa_2S_4$ to yield IR transmission of a peak value of 57% within the IR wavelength range of 2 µm to 16 µm, either by using microwave sintering followed by hot isostatic press or spark plasma sintering followed by hot isostatic press or vacuum sintering at ($3\times10^{-6}$ torr) followed by hot isostatic press or hot press sintering followed by hot isostatic press and finally followed by mirror polished IR article, is obtained.

9 Claims, 11 Drawing Sheets

(51) Int. Cl.
*B28B 3/00* (2006.01)
*B28B 11/24* (2006.01)
*C01G 11/02* (2006.01)

(52) U.S. Cl.
CPC .............. C01B 19/007 (2013.01); C01G 9/08 (2013.01); *C01P 2002/72* (2013.01); *C01P 2002/82* (2013.01); *C01P 2004/03* (2013.01); *C01P 2004/61* (2013.01); *C01P 2004/64* (2013.01); *C01P 2006/60* (2013.01); *C01P 2006/90* (2013.01)

(58) Field of Classification Search
CPC .............. C01P 2002/72; C01P 2002/82; C01P 2004/03; C01P 2004/61; C01P 2004/64; C01P 2006/60; C01P 2006/90
See application file for complete search history.

Table 1: Physical properties of $CaLa_2S_4$ compared with ZnS

| Physical Properties | $CaLa_2S_4$ | ZnS |
|---|---|---|
| Flexural Strength MPa | 106 | 103 |
| Young's Modulus GPa | 96 | 75 |
| Poisson's Ratio | 0.26 | 0.27 |
| Knoop Hardness kg/mm$^2$ | 559 | 245 |
| Thermal Expansion x $10^{-6}$ /°C | 14.7 | 7.4 |
| Thermal Conductivity 25 °C | 0.004 | 0.04 |

Fig. 8

SELF PROPAGATING LOW TEMPERATURE SYNTHESIS OF CALA2S4 AND FABRICATION OF IR WINDOW

BENEFIT OF PRIOR APPLICATION—CONTINUATION IN PART

Application Ser. No. 13/371,187, which is continuation of Application Ser. No. 61/463,039 filed on Feb. 10, 2012
Filing date: Feb. 11, 2011
Publication #US-20120205540.
Continuation of application Ser. No. 13/407,223 now U.S. Pat. No. 8,426,817; continuation of application Ser. No. 13/904,786 now U.S. Pat. No. 8,803,088
Continuation of application Ser. No. 15/390,853 now approved for allowance and for which

CROSS REFERENCE TO RELATED APPLICATION

1. US Published Application #-20120205540-Filed on Feb. 11, 2011
2. U.S. Pat. No. 8,426,817, D. Ravichandran and B. Devan.
3. U.S. Pat. No. 9,575,219, D. Ravichandran and B. Devan.
4. U.S. Pat. No. 8,803,088, D. Ravichandran and Yitong Shi.
5. U.S. patent application Ser. No. 15/390,853, approved for allowance, D. Ravichandran and Channu V. Reddy, May 8, 2019.

STATEMENT REGARDING FEDERALLY SPONSORED RESEARCH OR DEVELOPMENT

Yes. Funded by the U.S. Naval Air Warfare CTR, Lakehurst, N.J. 08733 under Contract #N68335-20-C-0109.

OTHER PUBLICATIONS

1. W. B. White, "Advanced Optical Ceramics, Phase II, p. 111, Annual Report, Jun. 1, 1979-May 31, 1980. U.S. Navy Contract No. N001-78-C-0466.
2. Daniel C Harris, "Development of Hot-Pressed and Chemical-Vapor-Deposited Zinc Sulfide and Zinc Selenide in the United States for Optical Windows", (2007), Proceedings of SPIE, XP002515445, vol. 6545, No. 1, pp. 654502-1-654502-27.
3. Daniel L. Chess, Catherine A. Chess, Judith A. Marks and William B. White, J. of Ceram. Proc. Res. Vol. 11, No. 4, pp. 465 (2010).
4. Daniel L. Chess, Catherine A Chess, J. Biggers and W.B White 1983a J. Amer. Ceram Soc. 66 18 -22.
5. D. L Chess, C. A Chess and W. B White, 1983b, J Amer. Ceram. Soc. 66 C205-C207.
6. D.L Chess, C. A Chess and W. B White, 1984 Mat. Res. Bull. 19 1551-1558.
7. J. Covino, D. C Harris, M. E Hills, R. T. Loda and R.W Schwartz, 1984 SPIE 505 42-46.
8. J. A Savage and K. L. Marsh, 1981 SPIE 297 35-37.
9. K. J Saunders, T. Y. Wong and R. L Gentilman, 1984 SPIE 505 31-34.
10. J. A. Savage, Infrared Optical Materials and Their Antireflection Coatings, Adam Hilger Ltd., Bristol and Boston (1985), pp. 95-111.
11. D. Ravichandran and V. S. Reddy Channu, ZnS—Ga composite sensor windows with increased hardness for LWIR applications. 15th Electro-Magnetic Dept. of Defense Window Symposium, Presented at the Office of Naval Research, May 17-19, 2016. Arlington, Va.
12. J. J. Kingsley, K. C. Patil, Mater. Lett. 6 (11, 12) (1988) 427-432.
13. L. A. Chick, L. R. Pederson, G. D. Maupin, J. L. Bates, L. E. Thomas, G. J. Exarhos, Mater. Lett. 10 (1, 2) (1990) 6-12.
14. L. R. Pederson, G. D. Maupin, W. J. Weber, D. J. McCready, R. W. Stephens, Mater. Lett. 10 (9) (1991) 437-443.

REFERENCE TO SEQUENCE LISTING, A TABLE, OR A COMPUTER PROGRAM LISTING COMPACT DISK APPENDIX

Not Applicable

BACKGROUND OF THE INVENTION

Field of Invention

The invention relates generally to the production of mid-wave and long-wave dual band multi-spectral infrared (IR) optical windows, and more specifically to the material and process for fabricating such windows. These IR windows are employed in Aircrafts and missiles. The materials include Chalcogenide such as $CaLa_2S_4$, CdS, and ZnSe. Fine grain optical windows incorporate nanoscale materials that are synthesized, pre-treated and sintered for use in multi-spectral domes and windows application. This invention is continuation-in-part of the invention on "Self-Propagating Low-Temperature Synthesis and pre-treatment of Chalcogenides for Spark Plasma Sintering" with application Ser. No. 15/390,853 (Publication No US 2018/0290896) filed on Dec. 27, 2016 by inventor Ravichandran et.al.

Description of Prior Art

Infrared optical equipment deployed in future aircraft and missile homing seekers will require very robust IR windows. Hence the optical, thermal and mechanical properties of these window materials will need to be optimum to ensure adequate performance. Optical windows and domes employed in missile systems for IR imaging demand good mechanical stability and high optical transmission in the wavelength range between 0.4 micron up to 16 microns. Calcium Lanthanum Sulfide ($CaLa_2S_4$), Zinc Selenide (ZnSe), Germanium (Ge), Gallium Arsenide (GaAs), Gallium Phosphide (GaP), Mercury (Hg) and Cadmium Telluride (CdTe) are used in applications such as missile domes which require high transmission in the visible, mid IR and in the long infrared wavelength. Germanium is extremely expensive due to its low availability in nature. The fabrication of $CaLa_2S_4$ and ZnSe via Chemical Vapor Deposition (CVD) process is problematic due to use of toxic gases, and is not an environmentally benign process. Moreover, the cost of production is very high due to low yield and extended processing time. Further, the materials synthesized for manufacturing these IR windows involve long processing times and have particle sizes in micron range, thus rendering poor optical and mechanical characteristics.

For example the material $CaLa_2S_4$, employed as a window material for mid-wave (MW), long wave-infrared (LWIR) wavelengths and in multispectral semi-active laser dome, is synthesized through Spray Pyrolysis [Daniel L. Chess, Catherine A. Chess, Judith A. Marks and William B.

White, J. of Ceram. Proc. Res. Vol. 11, No. 4, pp. 465 (2010)]. The spray pyrolysis method is also known as Evaporation Decomposition of Solutions (EDS). This method has long process times running in to 48 hours at 1000° C. In addition, the powder synthesized through this method, after subjected to sintering, yielded grain sizes in the range of 50 microns. Because of the large sizes of grains being in 50 microns range rather than in nanometer range, the IR transmission and mechanical strength are poor. To make things worse the process runs in to long duration of 48 hours, thus increasing the cost of manufacturing.

BRIEF SUMMARY OF THE INVENTION

To find a solution to the inferior IR transmission performance, inferior mechanical strength and high cost of manufacturing of $CaLa_2S_4$ windows, the present invention is focused on 'Self propagating low temperature synthesis of $CaLa_2S_4$', used as a window material for mid-wave, long wave-infrared (LWIR) wavelength and multispectral semi-active laser dome. Further a sintering process that has short process time yielding high mechanical strength coupled with high IR transmission characteristics is employed to obtain $CaLa_2S_4$ windows Calcium lanthanum sulfide ($CaLa_2S_4$) in particular and ternary rare earth (TRE) sulfides in general, have been shown to have the potential to meet future needs, in the range of 8-14 micrometer wavelength band [1], for more durable Infrared windows and domes made out of these materials. The specific applications of interest are large-size windows for FLIR (Forward Looking Infrared Systems) systems, aboard high-speed aircraft or hemispherical domes for air-to-surface IR guided missiles such as Maverick. In both types of systems, the strength and hardness of $CaLa_2S_4$ and its Intrinsic transmittance in the 0.4-16 micrometer wavelength regime represent marked potential for improved system performance relative to currently used materials such as germanium or zinc sulfide.

The present invention finds a solution to the long felt need of the industry by way of an innovative integrated process that comprises 'self-propagating low temperature synthesis' (SPLTS) of nano-particles, followed by pre-treatment of nano-particles and further followed by any one of the final sintering aspects such as spark plasma sintering, hot-press sintering, vacuum sintering and microwave sintering process. The nano-particles classified under Chalcogenides include nano-powders of $CaLa_2S_4$.

SUMMARY OF THE DISCLOSURE

An innovative process to make $CaLa_2S_4$ windows that are more erosion-resistant and possess ultra-high density can be visualized through the generation of population of ultra-fine powder via SPLTS followed by pre-treatment, prior to any of the sintering aspects including microwave sintering, vacuum sintering, hot-press sintering, and spark plasma sintering.

SPLTS involves an exothermic reaction between metal acetates, metal nitrates and a fuel at low temperature <500° C. SPLTS is an important powder processing technique generally used to produce complex oxide ceramics such as aluminates ($Al_2O_3$). The process involves the exothermic reaction of an oxidizer such as metal acetates, metal nitrates, ammonium nitrate, and ammonium perchlorate and an organic fuel, typically thiourea, ($CH_4N_2O$), Thioacetamide, carbohydrazide ($CH_6N_4O$), or glycine ($C_2H_5NO_2$). The SPLTS reaction is initiated in a muffle furnace or on a hot plate at temperatures of 500° C. or less; much lower than the phase transition of the target material.

In a typical reaction, the precursor mixture of water, including metal acetates, metal nitrates, and fuel including thiourea, glycerol and thioacetamides decomposes, dehydrates, and ruptures into a flame after about 30-40 min. The resultant product is a voluminous, foamy powder which occupies the entire volume of the reaction vessel. The chemical energy released from the exothermic reaction between the metal acetates, metal nitrates and fuel can rapidly heat the system without an external heat source. SPLTS powders are generally more homogeneous, have fewer impurities, and have higher surface areas than powders prepared by regular conventional solid-state methods.

CdS, $CaLa_2S_4$ and ZnSe nano-powders were also produced via SPLTS using respective acetates, Nitrates including Cadmium acetates, Cadmium Nitrates, Calcium Nitrates, Lanthanum Nitrates, Zinc acetates and Zinc Nitrates and Sulfur sources including thiourea, thioacetamides and Selenium disulfides.

Prior to any one of the sintering methods including microwave sintering, high temperature sintering, vacuum sintering, hot press sintering or Spark plasma sintering, the starting powder of nano-particles of $CaLa_2S_4$ produced via SPLTS undergoes a pre-treatment procedure in a controlled gas ambient at temperature as per the following procedure: (i) The powder is placed in a quartz boat and the powder is continuously heated anywhere between 800° C.-1000° C. for 4 to 12 hr. under a mixed gas ambient of H2S (5-20% H2S)+H2 (95-80%) or H2S (5-20% H2S)+N2 (95-80% N2 gas) or H2S (5-20% H2S)+Ar (95-80%) or Ar (100%) or H2S (100%) or N2 (100%). After that the furnace is cooled down to room temperature, the cooled Calcium Lanthanum sulfide powder is placed in a globe box, purged with Argon gas, then sieved through a 140-mesh sieve and stored in glass bottles in a humidity-controlled chamber containing drierite with less than 1% RH (relative humidity). From the powder, a 25.4 mm pellet was obtained by pressing the powder using a Tungsten carbide die sets at 7000 psi with a hold time of 4-7 minutes. Then the green body was CIPed at 30,000 psi for 5-7 minutes. This is followed by microwave sintered at a frequency of 2.45 GHZ at power level between 800-1100 watts at 1120° C. for 30-40 min under forming gas condition (H2/N2) to produce ultra-high-density ceramics. The sintered body was carefully taken out after cooling to room temperature (RT).

In an alternative method of spark plasma sintering the Calcium Lanthanum sulfide pellet of 25.4 mm diameter, thus obtained through cold press of nano-powder between Tungsten carbide die sets, is inserted inside a specially passivated cavity of the conductive mold and the mold with 25.4 mm disk of $CaLa_2S_4$ is placed inside a spark plasma chamber. The mold die-set materials include those made from the alloy TZM (Titanium-Zirconium-Molybdenum) or Graphite. Preferably, the mold is made of special grade graphite. In all these cases, special care is taken to eliminate contamination of sintered material emanating from the material of the mold. Pressure is applied to the mold from the top and bottom using upper and lower energizing punch electrodes, maintaining a temperature in the range of 750° C.-1020° C. inside the chamber. At the same time, pulsed direct current is allowed to flow through the mold through the energizing punch electrodes. A power supply for generating pulsed direct current may be utilized which is similar to the power supply used for an electrical discharge machine. The pulsed direct current in transition mode may be applied at an initial stage of sintering and continuous pulsed direct current through train of pulses may be applied thereafter or, alternatively, a continuous train of pulsed direct current may be applied throughout the sintering.

In the first embodiment, a method is provided for producing an article which is transparent to infrared in the wavelength range of 2 micron to 16 microns. The method includes the steps of forming ultra-fine powders of $CaLa_2S_4$ via SPLTS process, then treatment of ultra-fine powders in the temperature range of 800 C-1000 C for 4-12 hrs, under reducing gas atmosphere including $H_2$ or $H_2S$ or $N_2$ or Ar gases or mixtures of $H_2S/H2$ with preferred volume ratio 1:(4,9), H2S/N2 with volume ratio 1:(4,9) and $H_2S/Ar$ with volume ratio 1:(4,9) and followed by vacuum treatment to remove any surface contamination including oxygen and sulfates and other trace level impurities. The powder is sieved through a 140 mesh screen. A green body of 25.4 mm diameter, from a population of thus sieved nano-particles, is obtained by cold pressing the powder, using a Tungsten carbide die sets, in the pressure range of 5000-7000 psi with a hold time of 5-7 minutes and then cold isostatic pressed to densify the pellet with a pressure in the range of 30,000-40,000 psi in a rubber mold with a hold time of 5-7 minutes to attain 65%-70% of theoretical density. This is followed by vacuum sintering in a temperature range of 800° C.-1200° C. for 3-6 hrs and in the vacuum range of $10^{-5}$ Torr to $10^{-6}$ Torr and further followed by hot isostatic press in the range of pressure of 15,000-30,000 psi and in a temperature range of 800° C.-1200° C., thereby producing a sintered $CaLa_2S_4$ disk, which is subsequently mirror polished to obtain the disk that is transparent in the visible, mid IR and long IR wavelengths.

In the second embodiment, a method is provided for producing an article which is transparent to infrared in the wavelength range of 2 micron to 16 microns. The method includes the steps of forming ultra-fine powders of $CaLa_2S_4$ via SPLTS process, then treatment of ultra-fine powders in the temperature range of 800° C.-1000° C. for 4-12 hrs, under reducing gas atmosphere including $H_2$ or $H_2S$ or $N_2$ or Ar gases or mixtures of $H_2S/H2$ with volume ratio 1:(4,9), H2S/N2 with volume ratio 1:(4,9) and H2S/Ar with volume ratio 1:(4,9) and followed by vacuum treatment to remove any surface contamination including oxygen and sulfates and other trace level impurities. The powder is sieved through a 140 mesh screen. A green body of 25.4 mm diameter, from a population of thus sieved nano-powder, is obtained by cold pressing the powder, using a Tungsten carbide die sets, in the pressure range of 5000-7000 psi with a hold time of 5-7 minutes and then cold isostatic pressed to densify the pellet with a pressure in the range of 30,000-40,000 psi in a rubber mold with a hold time of 5-7 minutes to attain 65%-70% of theoretical density. This is followed by Microwave sintering at a frequency of 2.45 GHz and at power level between 800-1100 watts at 1120° C. for 30-40 min under forming gas condition (H2/N2) and further followed by hot isostatic press in the range of pressure of 15,000-30,000 psi and in a temperature range of 800° C.-1200° C., thereby producing a sintered article $CaLa_2S_4$ disk, which is subsequently mirror polished to obtain the disk that is transparent in the visible, mid IR and long IR wavelengths.

In the third embodiment, a method is provided for producing an article which is transparent to infrared in the wavelength range of 2 micron to 16 microns. The method includes the steps of forming ultra-fine powders via SPLTS process, then treatment of ultra-fine powders in the temperature range of 800° C.-1000° C. for 4-12 hrs, under reducing gas atmosphere including $H_2$ or $H_2S$ or $N_2$ or Ar gases or mixtures of $H_2S/H2$ with volume ratio 1:(4,9), $H_2S/N_2$ with volume ratio 1:(4,9) and H2S/Ar with volume ratio 1:(4,9) and followed by vacuum treatment to remove any surface contamination including oxygen and sulfates and other trace level impurities. The powder is sieved through a 140 mesh screen. A green body of 25.4 mm diameter, from a population of thus sieved nano-powder, is obtained by cold pressing the powder, using a Tungsten carbide die sets, in the pressure range of 5000-7000 psi with a hold time of 5-7 minutes. The green body of 25.4 mm diameter disk of $CaLa_2S_4$ thus obtained is inserted inside a specially passivated cavity of the conductive mold and placed inside a spark plasma chamber. The mold die-set materials include those made from the alloy TZM (Titanium-Zirconium-Molybdenum) or Graphite. Preferably, the mold is made of special grade graphite. In all these cases, special care is taken to eliminate contamination of sintered material emanating from the material of the mold. Pressure is applied in the range of 100-120 MPa to the mold from the top and bottom using upper and lower energizing punch electrodes, maintaining a temperature in the range of 850° C.-1020° C. for 5-10 minutes inside the chamber. At the same time, pulsed direct current is allowed to flow through the mold through the energizing punch electrodes. A power supply for generating pulsed direct current may be utilized which is similar to the power supply used for an electrical discharge machine. The pulsed direct current in transition mode may be applied at an initial stage of sintering and continuous pulsed direct current through train of pulses may be applied thereafter or, alternatively, a continuous train of pulsed direct current may be applied throughout the sintering. The spark current passing between the grains weld the grains (sintering). This is followed by hot isostatic press in the range of pressure of 15,000-30,000 psi and in a temperature range of 800° C.-1200° C., thereby producing a sintered article $CaLa_2S_4$ disk, which is subsequently mirror polished to obtain the disk that is transparent in the visible, mid IR and long IR wavelengths.

In the fourth embodiment, a method is provided for producing an article which is transparent to infrared in the wavelength range of 2 micron to 16 microns. The method includes the steps of forming ultra-fine powders via SPLTS process, then treatment of ultra-fine powders under reducing gas conditions including $H_2$ or $H_2S$ or $N_2$ or Ar gases or mixtures of $H_2S/H2$ with volume ratio 1:(4,9), H2S/N2 with volume ratio 1:(4,9) and H2S/Ar with volume ratio 1:(4,9) and followed by vacuum treatment to remove any surface contamination including oxygen and sulfates and other trace level impurities. The powder is sieved through a 140 mesh screen. A green body of 25.4 mm diameter, from a population of thus sieved nano-particles, is obtained by cold pressing the powder, using a Tungsten carbide die sets, in the pressure range of 5000-7000 psi with a hold time of 5-7 minutes and then cold isostatic pressed to densify the pellet with a pressure in the range of 30,000-40,000 psi in a rubber mold with a hold time of 5-7minutes to attain 65%-70% of theoretical density. This is followed by hot press sintering in the pressure range of 100-120 MPa and in a temperature range of 900° C.-1200° C. for 6-12 hours in vacuum and further followed by hot isostatic press in the range of pressure of 15,000-30,000 psi and in a temperature range of 800° C.-1200° C., thereby producing a sintered article $CaLa_2S_4$ disk, which is subsequently mirror polished to obtain the disk that is transparent in the visible, mid IR and long IR wavelengths.

Hot Isostatic press (HIP) is the final operation in all the foregoing embodiments and its process is broadly as follows:

The HIP process subjects a component to both elevated temperature and isostatic gas pressure in a high-pressure containment vessel. The pressurizing gas most widely used is Argon. An inert gas is used, so that the material does not chemically react. The chamber is heated, causing the pressure inside the vessel to increase. Many systems use associated gas pumping to achieve the necessary pressure level. Mechanical pressure is applied to the material from all directions (hence the term "isostatic"). The HIP is performed in a pressure range of 15,000-30,000 psi and in a temperature range of 800° C.-1200° C., and more preferably, at a temperature within the range of 850° C.-1180° C. to achieve visually transparent, mid-IR active and samples of multispectral grade of $CaLa_2S_4$. This sample is transparent in the visible range, mid IR range and long wavelength region. The samples were cut and polished using several grades of diamond pastes.

The $CaLa_2S_4$ ceramic disks are preferably polished in three different steps such as grinding, polishing, and fine polishing. Initial grinding removes any saw marks and cleans the specimen surface. This is accomplished manually on a dry 240 grit $Si_3N_4$ sand paper. The $Si_3N_4$ abrasive particles are bonded to the paper for fast stock removal. The polishing and fine polishing removes the artifacts of grinding. During polishing, a COTLAP™ Polish Cloth was used with 3 μm diamond powder. A mirror finish was achieved using a RAYON™ Velvet polish cloth with 1 μm diamond on it. In both polishing and fine polishing, the diamond abrasive particles were suspended in oil and thus were able to roll or slide across the cloth in order to obtain mirror polished sintered body.

The sintered ceramic windows disclosed herein may be supplemented with coatings to further enhance their properties and to provide increased protection. An anti-reflective coating, for example, may be applied to minimize the reflection of infrared radiation and thereby cause more of the radiation to pass through the window. Examples of coating materials for this purpose are low refractive index materials, particularly yttria, silica, magnesium fluoride, calcium fluoride, zinc fluoride, zinc selenide, and Hafnium oxide. Multiple antireflective coatings may also be used. In some applications, a coating that will transmit visible radiation in addition to the infrared radiation may be desired. Examples of coating materials for this purpose are leaded glass and Zinc Selenide. In addition, coatings for scratch or erosion resistance may be applied, particularly for enhanced protection against rain, blowing sand, and particle impacts in general. Materials with a high damage threshold velocity, such as gallium phosphide, sapphire, spinel, and aluminum oxy-nitride (ALON) may also be utilized.

DETAILED DESCRIPTION OF DRAWINGS

Figure 1A:
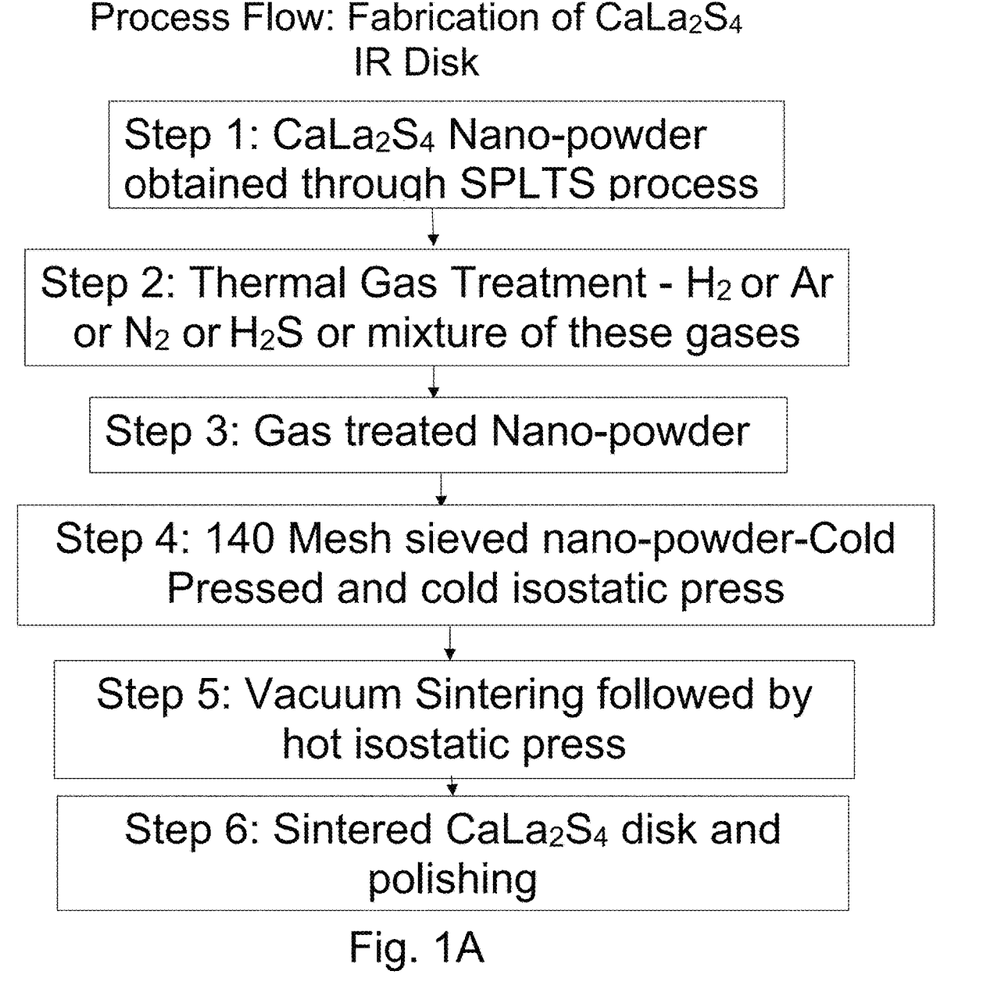
FIG. 1A is a flow chart depicting the first embodiment of a method for producing sintered article of $CaLa_2S_4$ in accordance with the teachings herein.

FIG. 1A shows the process flow chart of the innovative integrated process of the current invention resulting in $CaLa_2S_4$ IR window. In step 1, the process commences with $CaLa_2S_4$ nano-powder obtained through SPLTS process. In step 2 the nano powder undergoes a heat treatment in any one of the gases namely, $H_2$ or Ar or $N_2$ or $H_2S$ or mixture of these gases, in a temperature range 800° C.-1000° C. for 12 hours. In step 3, gas treated nano-powders are obtained. In step 4, gas treated nano-powders are sieved through 140 mesh screen and cold pressed to obtain 25.4 mm disk followed by cold isostatic press for densification. The cold press to obtain 25.4 mm green body is done using a Tungsten carbide die sets, in a pressure range of 5000-7000 psi with a hold time of 5-7 minutes. The cold isostatic press is done with a pressure in the range of 30,000-40,000 psi in a rubber mold with a hold time of 5-7 minutes to attain 65%-70% of theoretical density. This is followed by, in step 5, vacuum sintering in a temperature range of 800° C.-1200° C. for 3-6 hrs and in the vacuum range of $10^{-5}$ Torr to $10^{-6}$ Torr and further followed by hot isostatic press in the range of pressure of 15,000-30,000 psi and in a temperature range of 800° C.-1200° C., thereby producing a sintered $CaLa_2S_4$ disk, which is subsequently, as shown in step 6, mirror polished to obtain the IR disk that is transparent in the visible, mid IR region and long IR wavelengths.

Figure 1B:
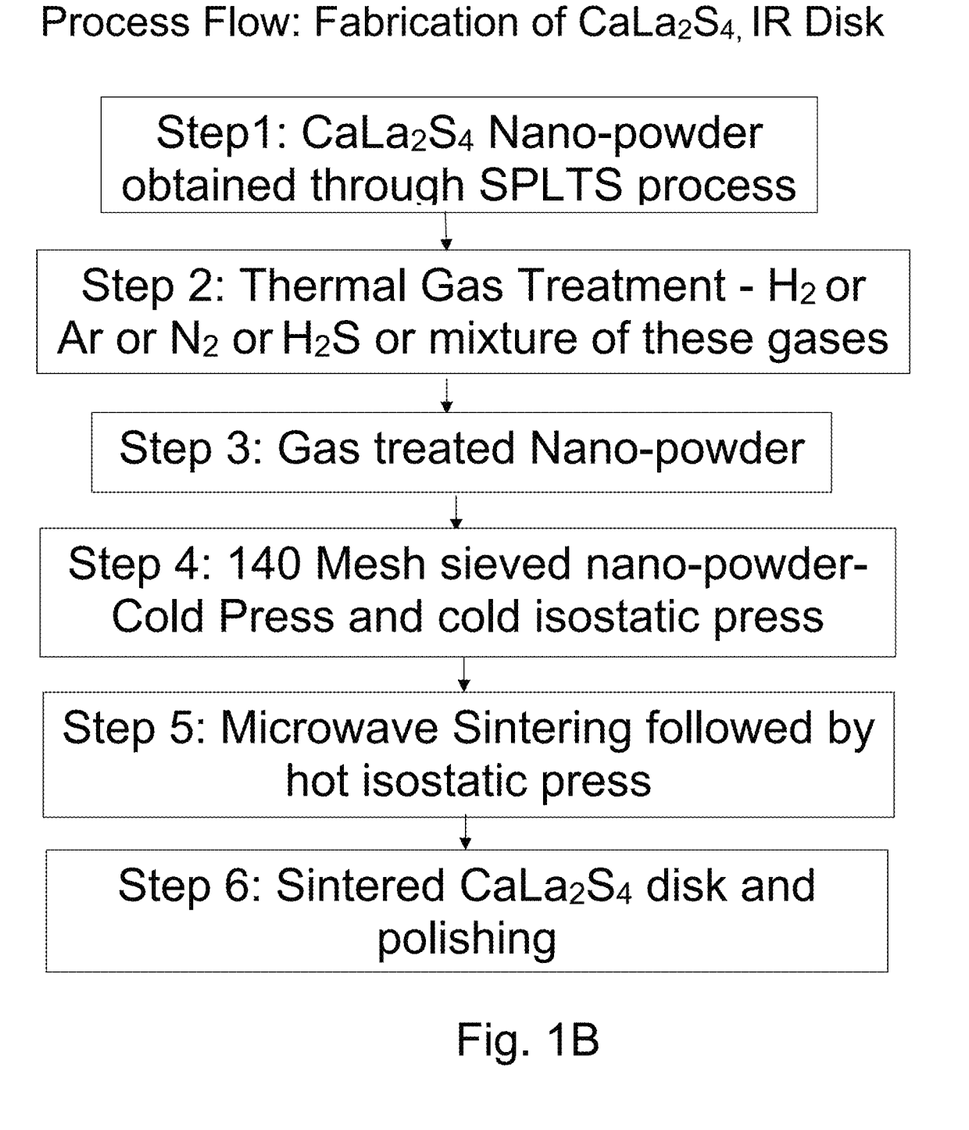
FIG. 1B is a flow chart depicting the second embodiment of a method for producing sintered article of $CaLa_2S_4$ in accordance with the teachings herein.

FIG. 1B shows the process flow chart of the innovative integrated process of the current invention resulting in $CaLa_2S_4$ IR window. In step 1, the process commences with $CaLa_2S_4$ nano-powder obtained through SPLTS process. In step 2 the nano powder undergoes a heat treatment in any one of the gases namely, $H_2$ or Ar or $N_2$ or $H_2S$ or mixture of these gases. In step 3, gas treated nano-powders are obtained. In step 4, gas treated nano-powders are sieved through 140 mesh and cold pressed to obtain 25.4 mm disk of green body followed by cold isostatic press to improve densification. The cold press is to obtain 25.4 mm green body done using a Tungsten carbide die sets, in a pressure range of 5000-7000 psi with a hold time of 5-7 minutes. The cold isostatic press is done with a pressure in the range of 30,000-40,000 psi in a rubber mold with a hold time of 5-7 minutes to attain 65%-70% of theoretical density. This is followed by, in step 5 microwave sintering followed by hot isostatic press. The microwave sintering can be carried out at a frequency of 2.45 GHz and at a power level between 800-1100 watts at 1120° C. for 30-40 min under forming gas condition (H2/N2). This is followed by hot isostatic press in the range of pressure of 15,000-30,000 psi and in a temperature range of 800° C.-1200° C., thereby producing a sintered $CaLa_2S_4$ disk, which is subsequently mirror polished to obtain the disk that is transparent in the visible, mid IR and in the long IR wavelength region. As shown in step 6, the final sintered $CaLa_2S_4$ disk after polishing is obtained.

Figure 1C:
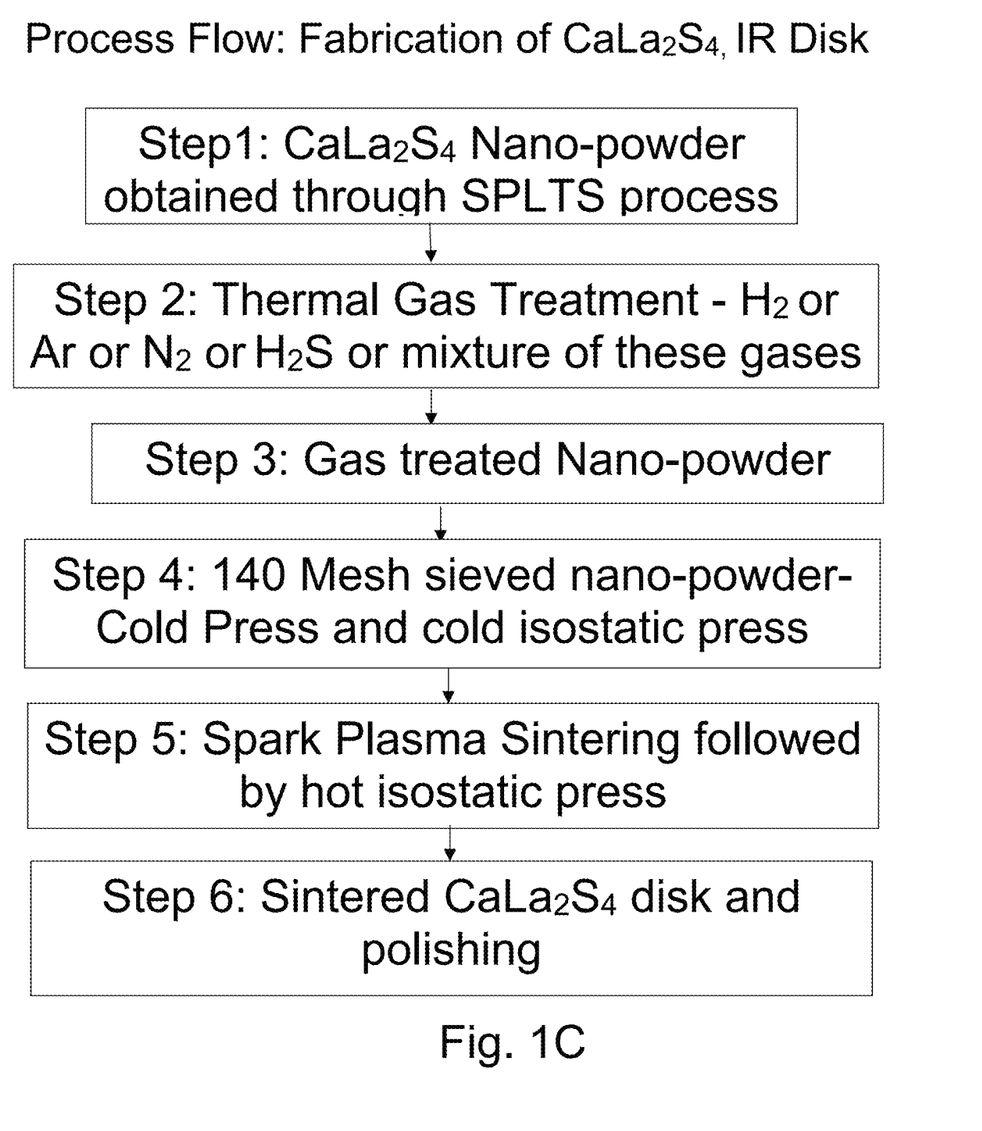
FIG. 1C is a flow chart depicting the third embodiment of a method for producing sintered article of $CaLa_2S_4$ in accordance with the teachings herein.

FIG. 1C shows the process flow chart of the innovative integrated process of the current invention resulting in $CaLa_2S_4$ IR window. In step 1, the process commences with $CaLa_2S_4$ nano-powder obtained through SPLTS process. In step 2 the nano powder undergoes a heat treatment in any one of the gases namely, $H_2$ or Ar or $N_2$ or $H_2S$ or mixture of these gases in the temperature range of 800° C.-1000° C. for 4-12 hrs. In step 4, the powder is sieved through a 140 mesh screen. A green body of 25.4 mm diameter, from a population of thus sieved nano-powder, is obtained by cold pressing the powder, using a Tungsten Carbide die sets, in a pressure range of 5000-7000 psi with a hold time of 5-7 minutes. The Spark plasma sintering can now be carried out by inserting the green body of 25.4 mm diameter disk of $CaLa_2S_4$ inside a specially passivated cavity of the conductive mold and placed inside a spark plasma chamber. The mold die-set materials include those made from the alloy TZM (Titanium-Zirconium-Molybdenum) or Graphite. Preferably, the mold is made of special grade graphite. In all these cases, special care is taken to eliminate contamination of sintered material emanating from the material of the mold. Pressure is applied in the range of 100-120 MPa to the mold from the top and bottom using upper and lower energizing punch electrodes, maintaining a temperature in the range of 850° C.-1020° C. inside the chamber. At the same time, pulsed direct current is allowed to flow through the mold through the energizing punch electrodes. A power supply for generating pulsed direct current may be utilized which is similar to the power supply used for an electrical discharge machine. The pulsed direct current in transition mode may be applied at an initial stage of sintering and continuous pulsed direct current through train of pulses may be applied thereafter or, alternatively, a continuous train of pulsed direct current may be applied throughout the sintering. The spark current passing between the grains weld the grains (sintering). This is followed by hot isostatic press in the range of pressure of 15,000-30,000 psi and in a temperature range of 800° C.-1200° C., thereby producing a sintered $CaLa_2S_4$ disk, which is subsequently mirror polished to obtain the IR disk that is transparent in the visible, mid IR and in long IR wavelength regions. As shown in step 6, the final sintered $CaLa_2S_4$ disk after polishing is obtained.

Figure 1D:
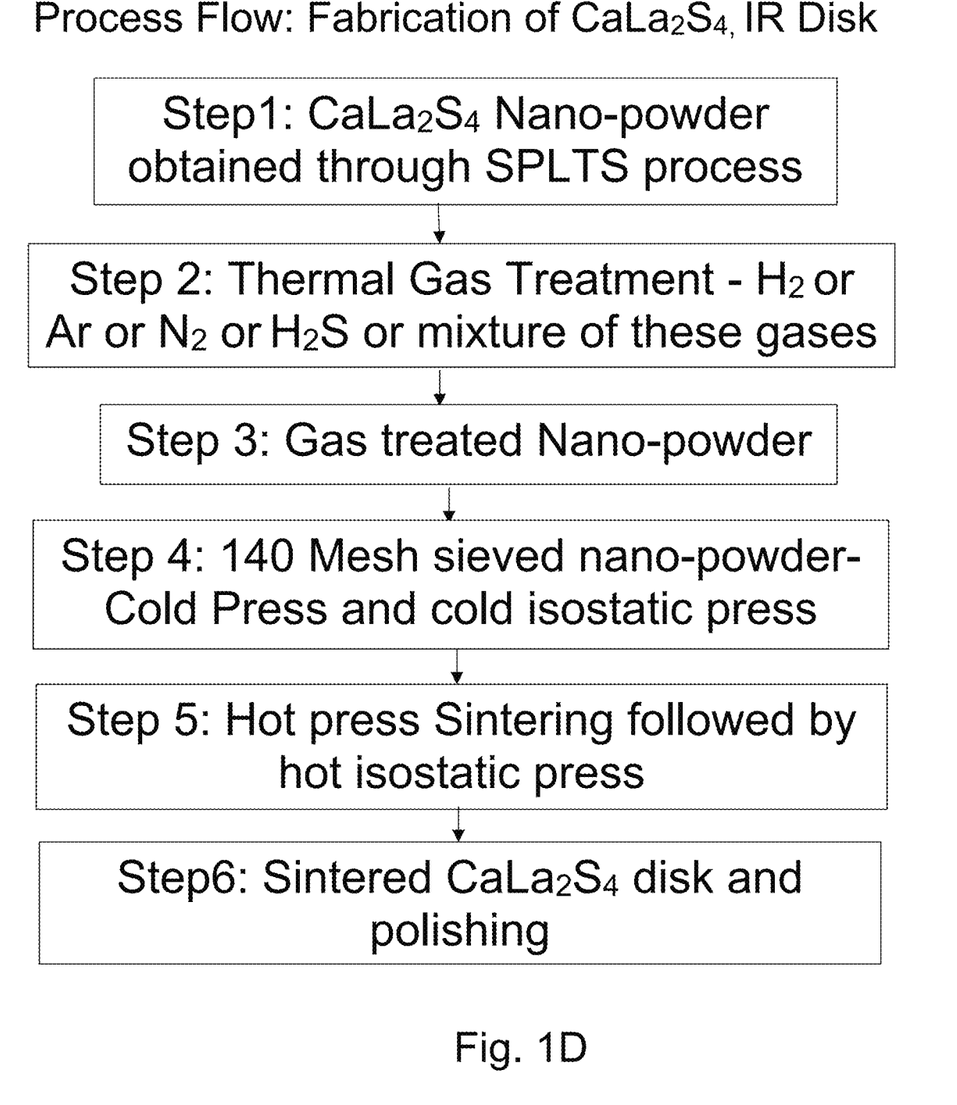
FIG. 1D is a flow chart depicting the fourth embodiment of a method for producing sintered article of $CaLa_2S_4$ in accordance with the teachings herein.

FIG. 1D shows the process flow chart of the innovative integrated process of the current invention resulting in $CaLa_2S_4$ IR window. In step 1, the process commences with $CaLa_2S_4$ nano-powder obtained through SPLTS process. In step 2 the nano powder undergoes a heat treatment in any one of the gases namely, $H_2$ or Ar or $N_2$ or $H_2S$ or mixture of these gases in the temperature range of 800 C-1000 C for 4-12 hrs. In step 4, the powder is sieved through a 140 mesh. A green body of 25.4 mm diameter, from a population of thus sieved nano-powder, is obtained by cold pressing the powder, using a Tungsten Carbide die sets, in a pressure range of 5000-7000 psi with a hold time of 5-7 minutes. and then cold isostatic pressed to densify the pellet with a pressure in the range of 30,000-40,000 psi in a rubber mold with a hold time of 5-7minutes to attain 65%-70% of theoretical density. This is followed by hot press sintering, as in step 5, in the pressure range of 50-100 MPa and in a temperature range of 900° C.-1200° C. for 6-12 hrs under a vacuum of $10^3$ Torr to $10^{-6}$ Torr. This is followed by hot isostatic press in the range of pressure of 15,000-30,000 psi and in a temperature range of 800° C.-1200° C., thereby producing a sintered $CaLa_2S_4$ disk, which is subsequently mirror polished to obtain the IR disk that is transparent in the visible, mid IR and in long IR wavelength region. As shown in step 6, the final sintered $CaLa_2S_4$ disk after polishing is obtained.

Figure 2:
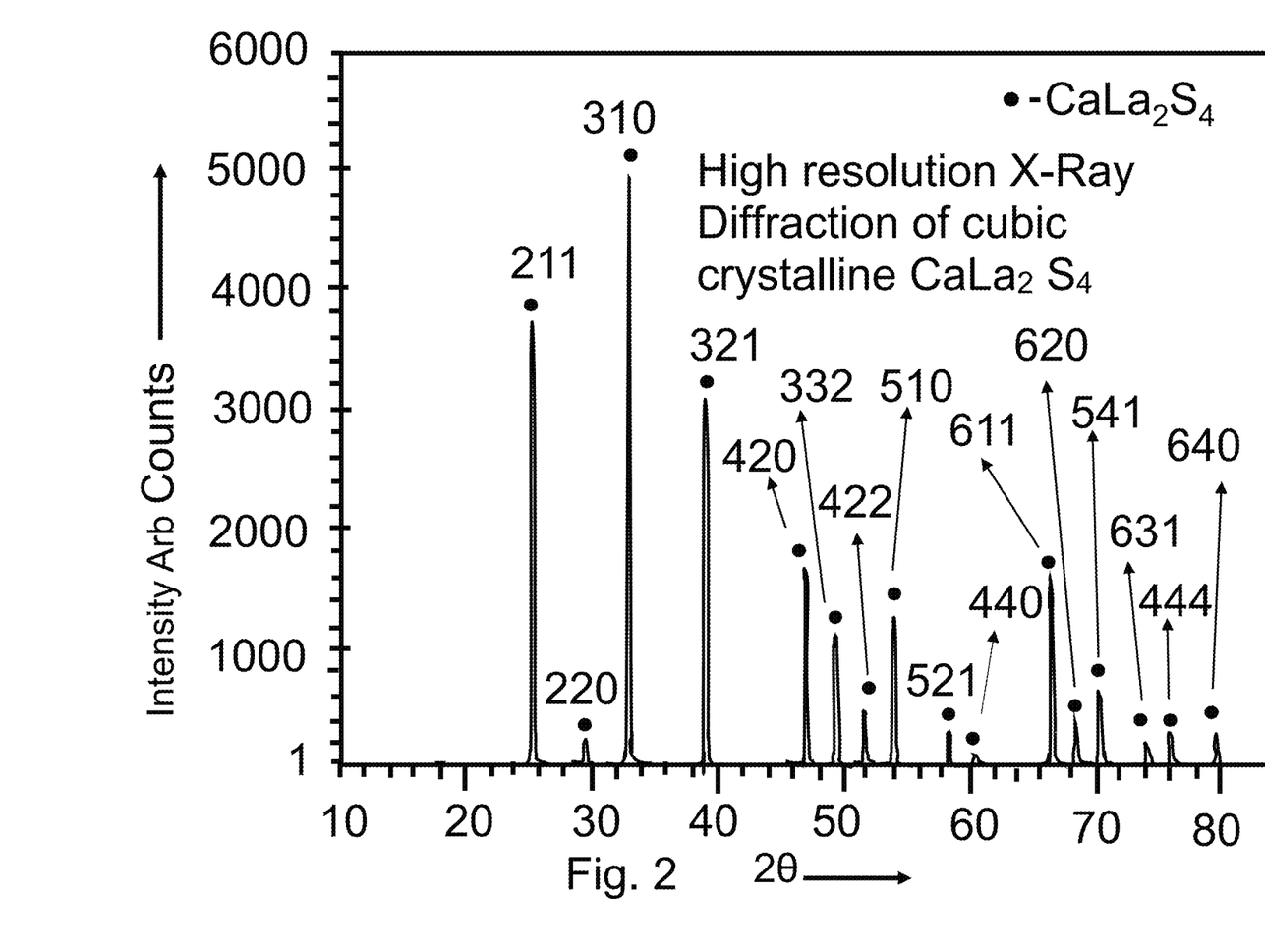
FIG. 2 is a high resolution powder X-ray diffraction pattern of a Calcium Lanthanum Sulphide nano-powder pretreated in reducing gas atmosphere powder samples made in accordance with a methodology of SPLTS process disclosed herein.
Figure 3:
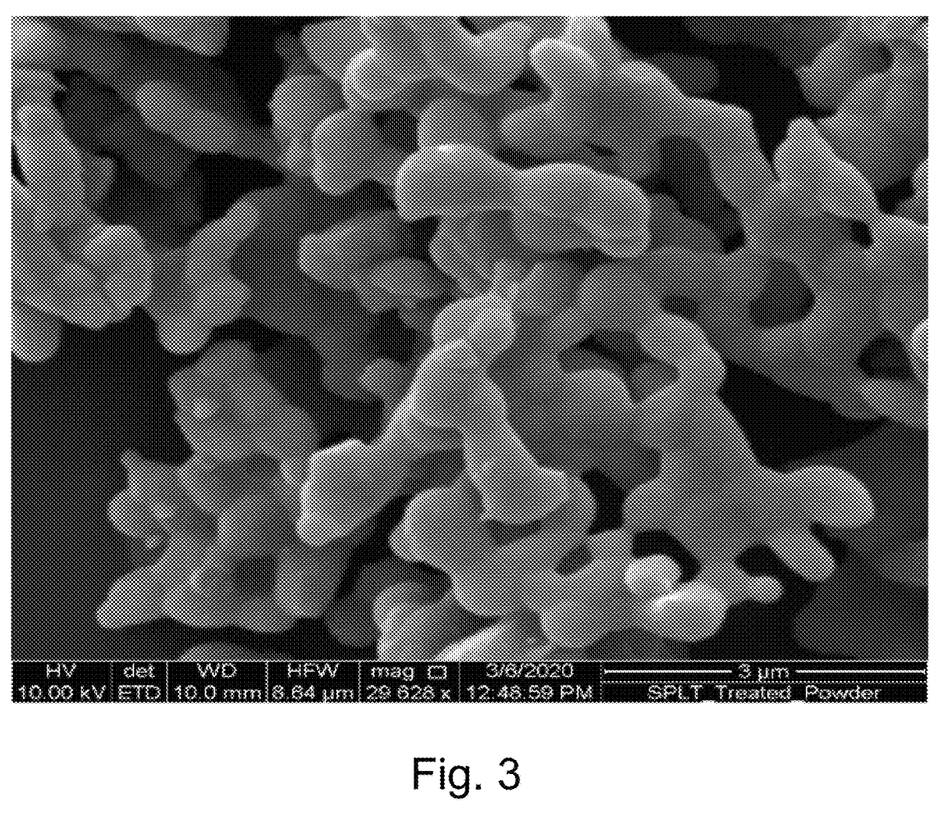
FIG. 3 is SEM image of $CaLa_2S_4$ powder obtained through SPLTS process and pre-treated in a reducing gas atmosphere.

FIG. 2 shows high resolution powder X-ray diffraction analysis of cubic crystalline $CaLa_2S_4$ ultra-high purity (99.999%) nano powder, obtained through SPLTS process followed by reducing gas thermal treatment. All the X-ray reflections could be indexed in terms of cubic $CaLa_2S_4$ crystal structure. Cubic crystalline $CaLa_2S_4$ phase structure can be seen through peaks represented by 211, 310, 321, 420, 332 etc. Many reflections indicate highly poly-crystalline material and represents the purity of the cubic crystalline structure of $CaLa_2S_4$ crystal and bears direct relation to the increased transmission of the crystal in the multi-spectral IR range. The powder X-ray diffraction samples were prepared for this test by mixing $CaLa_2S_4$ nanopowder with few drops of ethanol, made into a paste, filled in a special sample holder, and dried at 40° C. The dried holder is cooled to room temperature and examined for phase determination. The powder X-ray diffraction data was collected on a Rigaku (RU200B) computer-automated diffractometer with a copper (Cu) target and graphite-mono-chromated Radiation. The X-ray source operates at 50 kV and 180 mA. A single crystal of silicon (Si) and aluminum (Al) were used as calibration standards. The obtained powder pattern of $CaLa_2S_4$ was compared with the standard JCPDS file card [20-0339] for $CaLa_2S_4$ FIG. 3 shows SEM (Scanning Electron Microscopy) morphology of $CaLa_2S_4$ are crystalline nanoparticles with ~300 nm particle size and is clearly visible. The nanoparticles are very crystalline in nature and suitable for sintering to produce ultra-high-density Infra-red ceramic windows.

Figure 4:
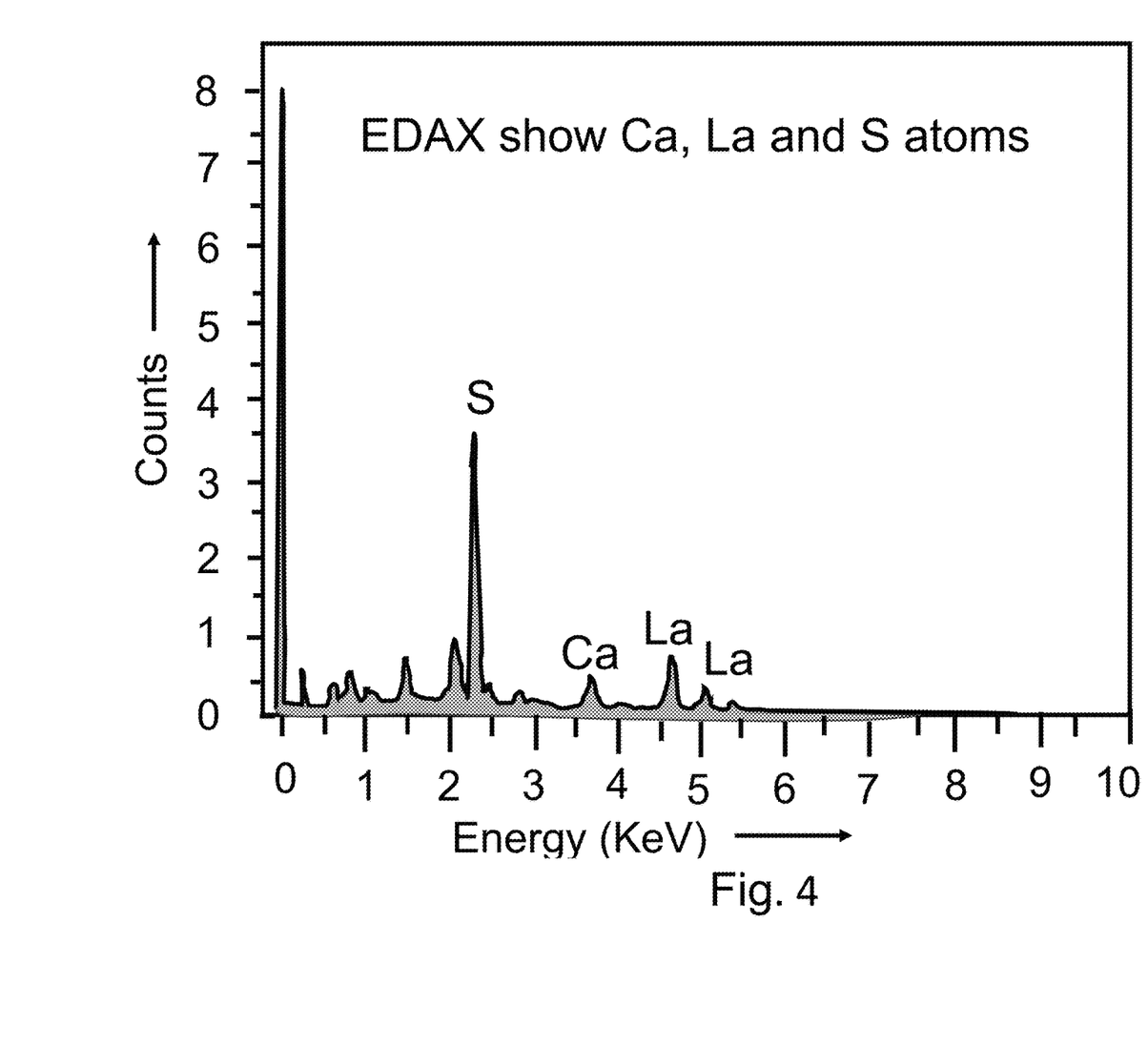
FIG. 4 is Energy Dispersive X-ray Analysis (EDAX) spectrum of $CaLa_2S_4$ nano-powder

FIG. 4 shows the Energy Dispersive X-Ray Analysis of the sample of $CaLa_2S_4$ crystals synthesized through SPLTS process and followed by thermal gas treatment. The elemental analysis shows the peak corresponding to Sulphur, Calcium and Lanthanam.

Figure 5:
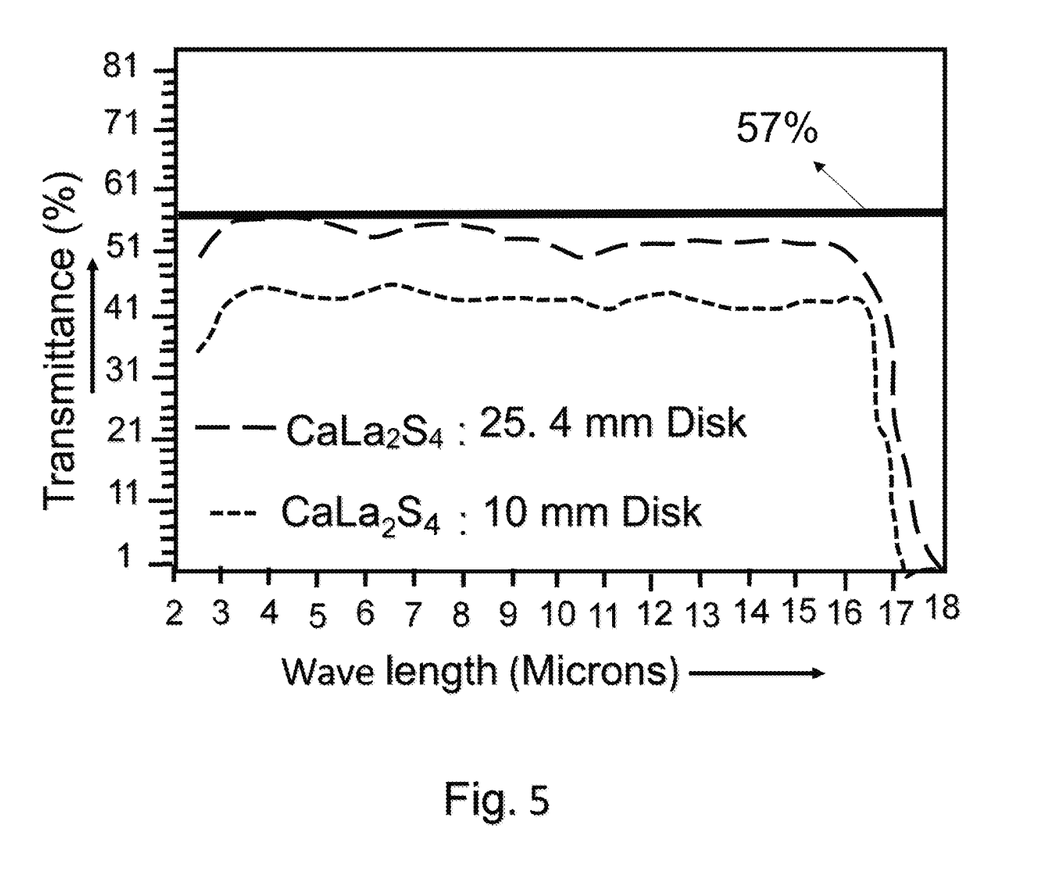
FIG. 5 is an FTIR spectrum of a $CaLa_2S_4$ article made in accordance with the teachings herein.

FIG. 5 shows the IR transmission of $CaLa_2S_4$ disk in accordance with the process flow of our first embodiment for a disk diameter of 25.4 mm. A peak transmission of 57% is seen as per the measurement.

Figure 6:
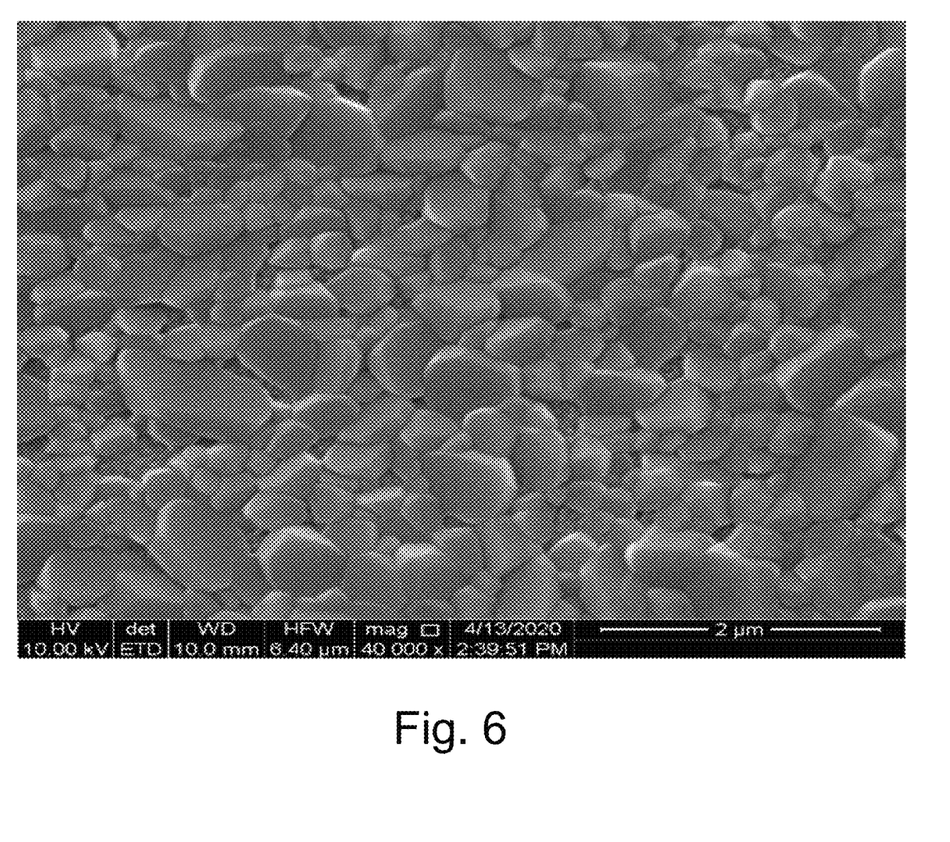
FIG. 6 is an SEM image of a sintered product made in accordance with the teachings herein.

FIG. 6 shows SEM image of the sintered disk. The SEM image exhibits high density of the sample without any pores or voids. The Knoop hardness for the sintered samples were measured and found to be in the range of 550-559 kg/mm$^2$. It also shows the grain size is approximately in the range of 300 nm to 2 μm.

Figure 7:
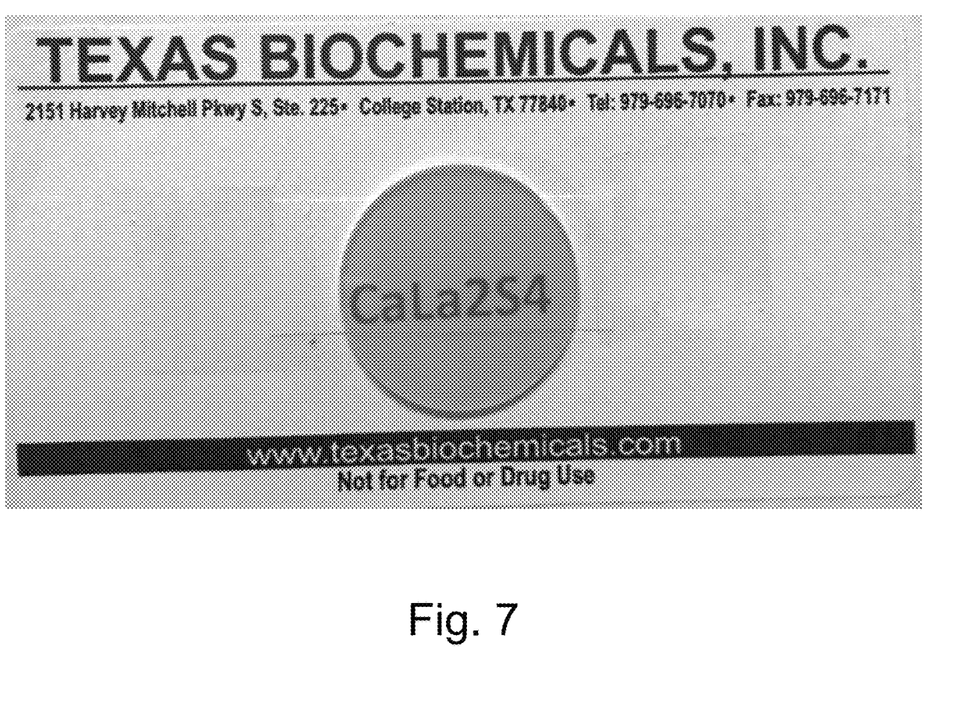
FIG. 7 is the final $CaLa_2S_4$ disk of 25.4 mm diameter exhibiting the transmission in the visible range when placed over the text of chemical formula '$CaLa_2S_4$' on a paper.

FIG. 7 shows the visual transmission exhibited by the $CaLa_2S_4$ disk fabricated in accordance with the process described under our first embodiment. The disk transmits visually a typed chemical formula $CaLa_2S_4$ on a sheet of paper when the disk was placed over it.

Figure 8:
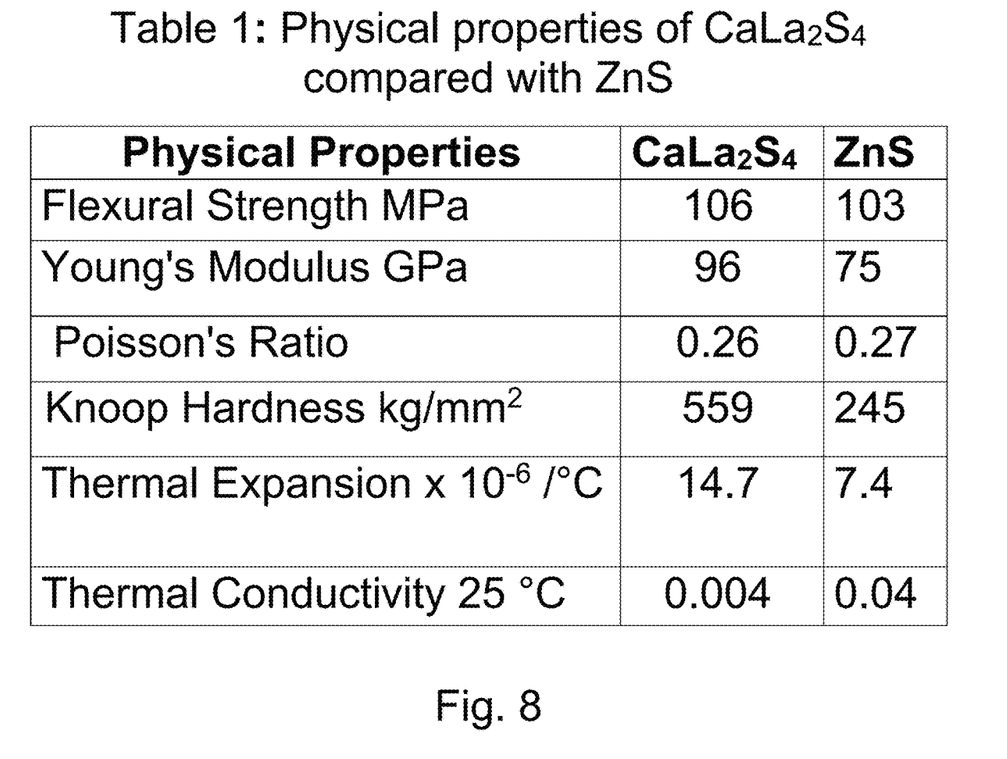
FIG. 8 shows the physical properties of sintered $CaLa_2S_4$ disk compared with ZnS IR transmitting disk.

FIG. 8 tabulates the mechanical and thermal properties of the $CaLa_2S_4$ disk fabricated in accordance with our process described under first embodiment. The comparison is made against ZnS disk. It can be seen that Knoop hardness (559 Kg/mm$^2$) is substantially higher than that of ZnS disk (245 Kg/mm$^2$).

The above description of the present invention is illustrative, and is not intended to be limiting. It will be understood that one skilled in the art could make various additions, substitutions and modifications to the above described embodiments without departing from the scope of the present invention. For example, (i) the die-set material can be made of alloy materials of Tungsten-Zirconium-Molybdenum (ii) sintering parameters could be changed for various sintering methods like, Microwave sintering, spark plasma sintering, RF sintering, Laser sintering, vacuum sintering (iii) parameters for hot or cold isostatic press could be modified (iv) sintering methods can be combined in any preferred sequence (v) SPLTS process parameter could be modified (vi) although the current invention focuses on $CaLa_2S_4$, but the process can be equally applied to CdS and ZnSe or any material falling in the family of Chalcogenides, such as ZnS, ZnTe. Accordingly, the scope of the present invention should be construed in reference to the appended claims.

Thus, I claim:

1. A process for producing an article which is transparent to Infrared (IR) in wavelength range of 2 μm to 16 μm, comprising:
    synthesizing ultra-fine powders utilizing oxidizer comprising metal acetates, metal nitrates with fuels glycine, thiourea, and thioacetamide, through Self-propagating low temperature synthesis (SPLTS) and generation of population of $CaLa_2S_4$ nanoparticles;
    pre-treating said $CaLa_2S_4$ nanoparticles with reducing or inert or neutral gases in a temperature range and time duration to obtain powder of $CaLa_2S_4$ nanoparticles;
    sieving said pre-treated powder of $CaLa_2S_4$ nanoparticles with 140 mesh screens;
    cold pressing said sieved powder of $CaLa_2S_4$ nanoparticles in a pressure range and time duration to obtain a green body of an article shaped in to a $CaLa_2S_4$ disk;
    cold-isostatic pressing said cold pressed $CaLa_2S_4$ disk in a range of pressure for a time duration to obtain densification;
    hot press sintering said cold-isostatically pressed $CaLa_2S_4$ disk in a range of punch pressure, vacuum and temperature for a time duration to obtain $CaLa_2S_4$ sintered ceramic disk;
    hot isostatic pressing said $CaLa_2S_4$ sintered ceramic disk at temperature range and pressure range in Argon (Ar) gas to obtain highly transparent article in the visible, mid IR and long IR wavelengths;
    polishing said hot isostatic pressed $CaLa_2S_4$ ceramic disk to obtain a final ultra-high transparent IR transmitting article; and
    wherein said polished $CaLa_2S_4$ ceramic disk with the thickness of 25.4 mm has a peak IR transmission of 57% in the range of wavelengths between 3 μm and 5 μm and about 50% transmission between 6 μm and 16 μm, possessing Knoop hardness of 559 $Kg/mm^2$.

2. The process for producing an article according to claim 1, wherein the pre-treatment of said $CaLa_2S_4$ nanoparticles is carried in $H_2$ or $N_2$ or Ar or $H_2S$ or mixtures thereof at a temperature in the range of 800° C. to 1000° C. and a time duration in the range of 4 to 12 hours.

3. The process for producing an article according to claim 1, wherein said sieved powder of $CaLa_2S_4$ nanoparticles are cold pressed in a pressure range of 5000-7000 psi with a hold time of 5-7 min to form green body of $CaLa_2S_4$ disk.

4. The process for producing an article according to claim 1, wherein said cold pressed $CaLa_2S_4$ disk is cold-isostatic pressed in the pressure range of 30,000-40,000 psi in a rubber mold with a hold time of 5 to 7 min. to attain 65%-70% of theoretical density.

5. The process for producing an article according to claim 4, wherein said cold iso-statically pressed $CaLa_2S_4$ nanoparticles are subjected to spark plasma sintering in the temperature range of 850°-1250° C. with punch pressure in the range of 100-120 Mpa, while passing pulse spark plasma current, skipping hot press sintering, followed by said hot-isostatic press in the range of pressure of 15,000-30,000 psi and in a temperature range of 800° C.-1200° C. under Ar gas atmosphere.

6. The process for producing an article according to claim 4, wherein said cold iso-statically pressed $CaLa_2S_4$ nanoparticles are subjected to microwave sintering at a frequency of 2.45 GHz and at power level between 800-1100 watts at 1120° C. for 30-40 min at atmosphere, skipping said hot press sintering, followed by said hot-isostatic press in the range of pressure of 15,000-30,000 psi and in a temperature range of 800° C.-1200° C. under Ar gas.

7. The process for producing an article according to claim 4, wherein said cold iso-statically pressed $CaLa_2S_4$ nanoparticles are subjected to vacuum sintering in a temperature range of 800° C.-1200° C. for 3-6 hrs and in the vacuum range of $10^{-5}$ Torr to $10^{-6}$ Torr, skipping said hot press sintering, followed by said hot-isostatic press in the pressure range of 15,000-30,000 psi and in a temperature range of 800° C.-1300° C. under Ar gas.

8. The process for producing an article according to claim 1, wherein said cold-isostatic pressed $CaLa_2S_4$ disk is subjected to said hot press sintering in the pressure range of 100-120 MPa and in a temperature range of 900° C.-1200° C. for 6-12 hours in vacuum range of $1\times10^{-3}$ to $3\times10^{-6}$ Torr, followed by said hot-isostatic press in the range of pressure of 15,000-30,000 psi and in a temperature range of 800° C.-1200° C.

9. The process for producing an article according to claim 1, wherein said SPLTS synthesis can be applied to synthesize CdS and ZnSe family of chalcogenides.

* * * * *